(12) United States Patent
Dunford et al.

(10) Patent No.: US 7,121,551 B2
(45) Date of Patent: Oct. 17, 2006

(54) BUSHING ARRANGEMENT FOR SEAL CAVITY PROTECTION IN ROTATING FLUID EQUIPMENT

(75) Inventors: Joseph R. Dunford, deceased, late of Waverley (CA); by Aniko Dunford, legal representative, Waverley (CA); Paul Hughes, Halifax (CA)

(73) Assignee: Enviroseal Engineering Products, Ltd., Waverley (CA)

( * ) Notice: Subject to any disclaimer, the term of this patent is extended or adjusted under 35 U.S.C. 154(b) by 0 days.

(21) Appl. No.: 10/483,987

(22) PCT Filed: Jun. 26, 2002

(86) PCT No.: PCT/CA02/00980

§ 371 (c)(1),
(2), (4) Date: Jun. 29, 2004

(87) PCT Pub. No.: WO03/010451

PCT Pub. Date: Feb. 6, 2003

(65) Prior Publication Data

US 2005/0040604 A1 Feb. 24, 2005

(30) Foreign Application Priority Data

Jul. 24, 2001 (CA) .................................. 2353708

(51) Int. Cl.
*F16J 15/34* (2006.01)
(52) U.S. Cl. ...................... 277/349; 277/411; 277/412; 277/430; 277/585; 277/512
(58) Field of Classification Search ........ 277/411–412, 277/431, 430, 425, 585, 512–516, 349
See application file for complete search history.

(56) References Cited

U.S. PATENT DOCUMENTS

| 2,758,857 | A | * | 8/1956 | Smith | 277/512 |
|---|---|---|---|---|---|
| 4,302,020 | A | * | 11/1981 | Morales | 277/530 |
| 4,305,592 | A | * | 12/1981 | Peterson | 277/430 |
| 4,572,519 | A | * | 2/1986 | Cameron et al. | 277/512 |
| 5,167,418 | A | * | 12/1992 | Dunford | 277/423 |
| 5,553,868 | A | * | 9/1996 | Dunford | 277/348 |
| 5,921,554 | A | * | 7/1999 | Derian et al. | 277/516 |
| 2004/0026876 | A1 | * | 2/2004 | Prinz | 277/628 |

* cited by examiner

*Primary Examiner*—Vishal Patel
(74) *Attorney, Agent, or Firm*—Jones, Tullar & Cooper, P.C.

(57) ABSTRACT

An arrangement (120) of members for a throat bushing for rotary fluid equipment includes a first member (122) that is useful for seal cavities that contain conventional packing, and a second bushing member (132) that will be used in conjunction with the first bushing member if the seal cavity utilize a mechanical seal at the remote end of the cavity. Both bushing members (122, 132) are provided with spiral grooves (140) in a central bore thereof for the removal of contaminants from the seal cavity. The distal end face (124) of the first bushing member is contoured to receive a mating proximal end face (144) of the second bushing member or to also receive the abutting face of a packing ring or a lantern ring. The arrangement of the invention allows an operator to switch between the use of a mechanical seal or conventional packing without having to discard his primary seal cavity protector.

6 Claims, 9 Drawing Sheets

BUSHING ARRANGEMENT FOR SEAL CAVITY PROTECTION IN ROTATING FLUID EQUIPMENT

The present invention relates to rotating equipment such as pumps and to the protection of such pumps at the seal cavities thereof.

BACKGROUND OF THE INVENTION

Pumps are used at the industrial level in many different industries for a variety of purposes. In the petroleum industry for example a large number of pumps of different sizes is used to perform a large number of pumping functions. In heavy industry it is not uncommon for pumps to fail because of contaminants contained within the pumpage or within the pump itself. Pumps are provided with a myriad of seals, bushings and packing arrangements to protect the components thereof from contamination and subsequent wear or damage.

Attempts have been made in the past to devise pump accessories that will reduce the damage due to such contaminants, one successful accessory being the SpiralTrac™ seal protector manufactured by EnviroSeal Engineering Products Ltd. of Nova Scotia, Canada. This device may be considered to be an annular bushing that is placed at the entrance to a seal cavity of a pump, the cavity being defined by a portion of the pump housing, a shaft that extends through the cavity, and means for sealing the cavity itself. The sealing means may take the form of a mechanical seal positioned at one (the distal) end of the cavity) or it may take the form of packing material that fills the cavity. In either case the SpiralTrac™ bushing is positioned at the proximal end of the cavity. The bushing includes a tapered central bore which has a spiral groove formed in its wall and that leads from adjacent the outer surface of the bushing towards the cavity entrance. The spiral groove decreases, generally, in diameter down to the innermost diameter of the bushing which defines a small annular gap around the shaft. As the shaft rotates any particulate material that enters the seal cavity during operation of the pump will be centrifugally forced into the spiral groove and will flow therealong towards the gap by the shaft. The particulate material will be forced outwardly through the gap to the exterior of the seal cavity. This bushing is disclosed and claimed in U.S. Pat. No. 5,553,868 of Sep. 10, 1996 and in Australian Patent No. 688,977 of Oct. 18, 1995 as well as in Canadian and European applications.

The bushing as taught in the aforementioned US patent is particularly advantageous with seal cavities that include a mechanical seal at the distal end thereof. The applicant herein also produces seal bushings which are especially adapted for use with packing material that in essence fills the seal cavity, which bushings operate on the same principle but require physical modifications to the design in order to accommodate the packing material. For example, a bushing for a packing environment requires a generally flat annular distal end face against which the packing material can abut, while such a flat face is not required or desired for a non-packing environment.

In some instances pump manufacturers or operators may wish to convert their pumps which use mechanical seals at the distal end of a seal cavity to pumps which use packing material within the seal cavity, or vice versa. If the pump is already using a SpiralTrac™ seal bushing for a mechanical seal cavity it would be necessary to discard that bushing and to replace it with one that is adapted for use with packing material. This would entail a not insubstantial expense, especially since the SpiralTrac™ bushing is considered to have a considerably longer life than conventional seal cavity bushings. There is therefore a need for a bushing arrangement that can be used with either a mechanical seal cavity or with a packing material cavity without considerable additional expense or effort on the part of the manufacturer or the operator.

SUMMARY OF THE INVENTION

As used herein with respect to bushings the word "proximal" is intended to refer to ends or faces that will be directed towards the seal cavity entrance while the word "distal" is intended to refer to ends or faces that will be directed towards the remote end of the seal cavity.

The present invention is intended to satisfy the need for a bushing arrangement that can be used in either of the conventional seal cavity environments as described above. In essence the present invention provides an arrangement which utilizes a minimum of two bushing members. The first or main member is designed for use with a packing material contained within the seal cavity, this bushing member including an annular distal end face against which the packing material can abut when it is positioned within the seal cavity. This bushing member includes as well the spiral groove as disclosed in the aforementioned US patent for the removal of contaminants from the seal cavity. It can also be provided with other features, as found in the existing SpiralTrac™ bushing, including tangential openings therethrough for flushing fluid, and axial grooves in the outer surface for drainage purposes.

The second bushing member includes distal and proximal end faces and a spiral groove therein. The proximal end face of the second member is shaped to mate with the distal annular end face of the first bushing member and the distal end face of the second member is very narrow in width, such that the spiral groove thereof starts very close to the outer wall of the seal cavity. The spiral groove of the second member leads smoothly into the spiral groove of the first member to ensure a smooth flow of contaminants from the distal end of the second member to the proximal end of the first member.

With the arrangement of the present invention one would combine the two bushing members together if one is trying to protect a seal cavity which includes a mechanical seal at one end and generally free space between the mechanical seal and the bushing arrangement. One would use only a first bushing member if the seal cavity is to be filled with packing material. If one wishes to convert from one type of seal cavity to the other then one need only either remove the second member from the combination of the first and second bushing members or add the second member to the first member, as required. Typically, the second bushing member will be smaller than the first member and the cost advantage to this arrangement will outweigh the additional cost of the second member relative to the first member or relative to two separate full-size bushings which would be otherwise required to effect a conversion from one style of seal cavity to the other.

In summary of the foregoing the present invention may be considered to provide a bushing arrangement for protecting a seal cavity of rotary fluid equipment, which cavity is defined in part by a rotatable shaft having an outer cylindrical surface, a surrounding housing having an inner cylindrical surface spaced radially outwardly of the shaft, an entrance zone, and an end remote from the entrance zone, the cavity being adapted to receive conventional packing material therein or to have a mechanical seal positioned at the remote end, the arrangement comprising: a) first and second generally cylindrical bushing members for positioning in the cavity, each such bushing member having an outer cylindrical surface for slidably engaging the housing inner surface, and an inner cylindrical bore of a diameter greater than the diameter of the shaft so as to define an annular gap between such bore and the shaft outer surface; b) the first bushing member having proximal and distal annular end faces; c) the inner bore of the first bushing member including first and second end sections of generally uniform diameter opening to the proximal and distal end faces respectively, a third section of increasing diameter adjacent the first section, and a fourth section of decreasing diameter between the third and second sections, at least the third section of the first bushing member bore defining a spiral groove opening towards the fourth bore section and having a hand in the same direction of rotation as the shaft; d) the second bushing member having a proximal end face for mating abutment against the distal end face of the first bushing member; and e) the inner bore of the second bushing member including a first section of generally uniform diameter opening to the second bushing member proximal end face, and a second section of increasing diameter leading from the first section to a distal end of the second bushing member, at least the second bushing member second bore section defining a spiral groove opening towards the second bushing member distal end and having a hand in the same direction of rotation as the shaft; f) whereby if the cavity contains packing only, a first bushing member will be positioned at the entrance zone with such packing abutting the first bushing member distal end face, and if the cavity contains a mechanical seal a first bushing member will be positioned at the entrance zone and a second bushing member will be positioned within the cavity with the proximal end face of the second bushing member abutting and mating with the distal end face of the first bushing member and the second bushing member second bore section facing towards the mechanical seal.

It is possible to effect several forms of the bushing arrangement of this invention and some of those forms will be described hereinbelow in a non-limiting manner and with reference to the accompanying drawings.

DESCRIPTION OF THE INVENTION

Figure 1:
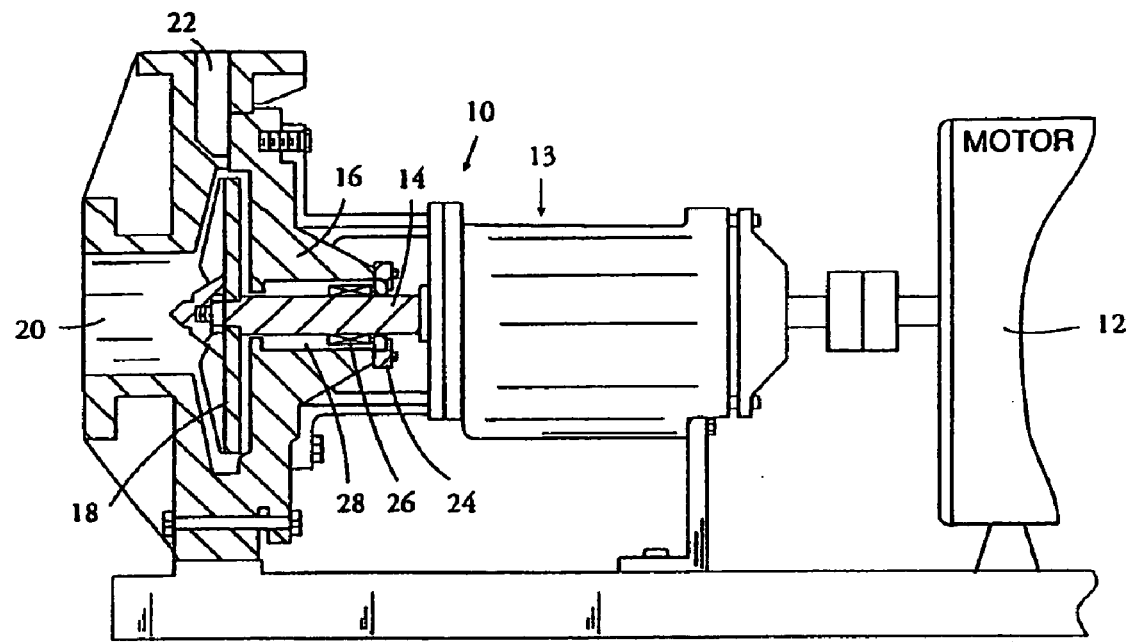
FIG. 1 is a side elevation in partial section of a prior art rotary fluid equipment without a seal cavity protector therein.

FIG. 1 illustrates a typical prior art environment for the device of the present invention. In this case the invention is used with rotary fluid equipment which includes a centrifugal pump 10 operated by an electric motor 12. The motor drives a rotary shaft 14 connected within a bearing housing 13. The shaft is connected to a centrifugal impeller 18 which, as it rotates, draws fluid in through inlet 20 and discharges the pumped fluid out through radial outlet 22. The shaft 14 is typically supported by bearings within the bearing housing 13. As seen in FIG. 1 a seal cavity 28 is defined in general by the shaft 14, the housing 16 which surrounds at least a portion of the shaft, the seals 26 which contact the shaft at one end of the cavity, and the gland 24 used to retain the seals in position. Set screws (not shown) may also be used to hold the seals in position.

Figure 2:
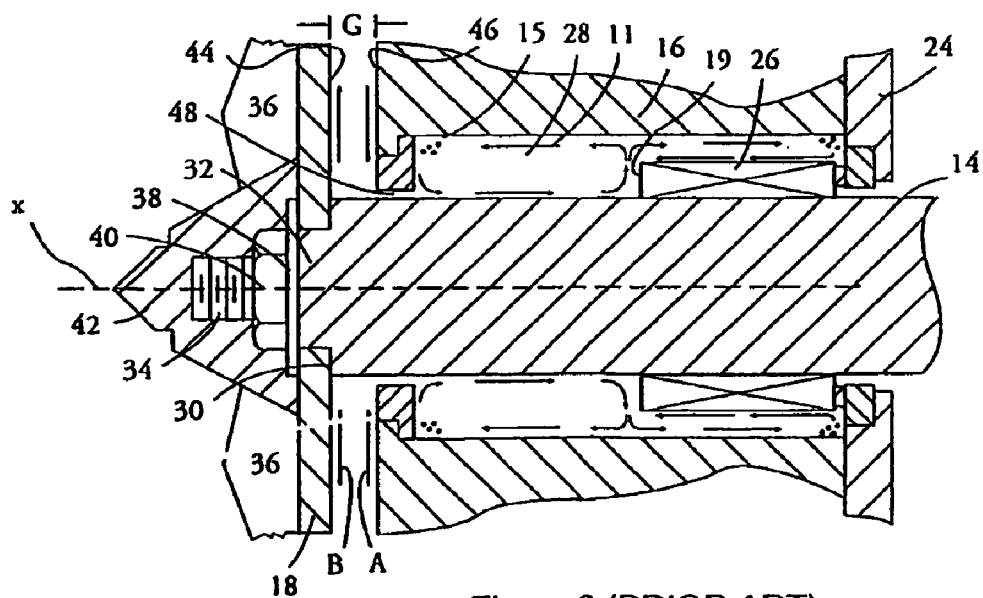
FIG. 2 shows an enlarged portion of the equipment of FIG. 1 illustrating the flow pattern within such a seal cavity.

FIG. 2 illustrates a somewhat enlarged view of the area where the shaft 14, having an axis X, connects to the impeller 18. It is seen therein that the shaft 14 has a shoulder 30 with a smaller diameter portion 32 extending therefrom. A threaded portion 34 projects from the portion 32 and abuts the shoulder 30. A washer 38 and nut 40 are drawn tight against impeller 18 to clamp it to the shaft 14 and a nose piece 42 fits over the nut, washer and exposed end of the threaded portion 34. With the impeller in place there is a thin gap G between the inner face 44 of the impeller 18 and the outer face 46 of the housing 16.

The flow pattern of the fluid in a typical centrifugal pump sets up counter currents which flow spirally inwardly within the gap G, as shown by the arrows A. Such counter currents carry particulate contaminant material which, if it enters the seal cavity 28, can damage the seals 26 and the rotary shaft 14.

It should be pointed out that the spirally inward flow A will generally be adjacent to the surface 46. Since there are dynamic forces at work there will, of course, be a spirally outward flow B as well, such as along surface 44, taking fluid away from the shaft area.

With further reference to FIG. 2, it can be seen that there will be fluid flow into the cavity 28 though the gap or opening 48 in the front face of the housing 16 adjacent the shaft 14. Such flow will include grip or particulate material which was moving spirally inwardly along the housing face 46. Within the cavity there will be flow of contaminant-carrying fluid generally along the path 11 shown by the arrows, bearing in mind that there is also a rotational component to the flow caused by shear between the fluid and the rotating shaft and seal, and between the rotating shaft and the housing cavity wall. The front face of the seal 26 during rotation imparts the radially outward movement to the fluid, a portion thereof flowing towards the front of the cavity and a portion flowing towards the back, between the seal and the housing. There will be a concentration of contaminants in the forward area 15 of the cavity 28, adjacent the radially outer junction between the housing cavity wall and the lip or throat flange of the housing at the forward end, making for an ideal location in which to position the device of the present invention.

Figure 3:
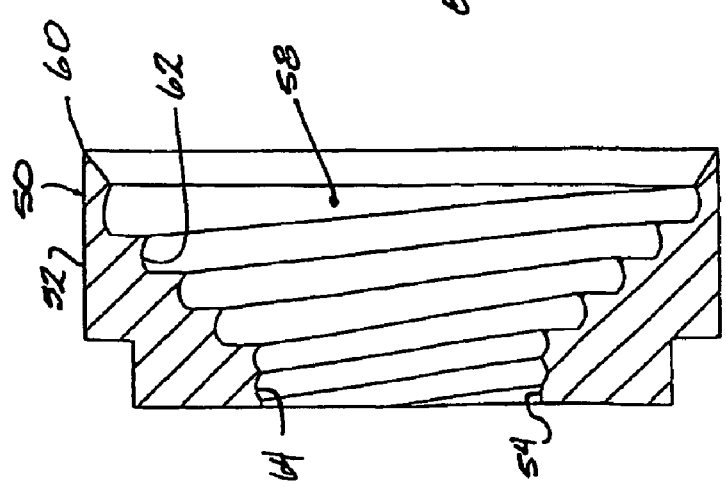
FIG. 3 is a cross-sectional view of a SpiralTrac™ bushing that can be used with a mechanical seal cavity.

FIG. 3 illustrates in cross-section a seal cavity protector or bushing 50 in accordance with the teachings of commonly owned U.S. Pat. No. 5,553,868 of Sep. 10, 1996 and which is intended to protect seal cavities such as illustrated in FIGS. 1 and 2, in particular seal cavities which are protected at one, the distal end by a mechanical seal 26. The bushing 50 is generally cylindrical in nature, having an outer cylindrical surface 52 which is adapted for a tight fit with the inner surface of the seal cavity and an inner cylindrical surface 54 which will be spaced slightly from the outer surface of the shaft 14, defining a gap therebetween. The bushing 50 has a central bore 58 which opens outwardly from the inner surface 54 towards the distal end face 60 thereof. A spiral groove 62 is cut or formed in the generally frustoconical face of the central bore 58 so as to face into the cavity. This groove captures fluid flowing in the cavity 28 and contaminants carried thereby, and specifically directs such fluid and contaminants towards the gap for removal from the cavity 28. Since pumps and other rotating fluid equipment may rotate in either direction, the hand of the spiral groove 62 must suit the rotation of the equipment with which it is to be used. As seen in FIG. 3 there is also a spiral groove 64 which extends along the inner cylindrical surface of the bushing, which groove continues from the inner end point of the groove 62 and progresses through to the impeller or proximal side of the bushing. The flow of contaminants extracted from the cavity by the first or principal groove 62 is enhanced by the second groove 64, thereby speeding up the removal of such contaminants from the cavity. If necessary, additional flushing fluid may be introduced to the bushing to help reduce shaft wear by also enhancing contaminant removal through the gap via the groove 64.

FIGS. 1 to 3 illustrate a typical seal cavity having a mechanical seal at the distal end thereof and a typical seal cavity protector or bushing in accordance with U.S. Pat. No. 5,553,868 which is particularly adapted to protect such a cavity and improve considerably the life of the cavity components, including the shaft, bearings and seals.

There are some installations where the seal cavities of such rotary fluid equipment do not utilize mechanical seals at the distal end of the cavity but, instead, fill most or all of the cavity with conventional packing material. Although there is little or no free space within the cavity during operation there is still fluid therein and there are still contaminants introduced to and created within the cavities. Such contaminants can be even more damaging than in the mechanical seal environment as they can become wedged between the packing and the shaft, increasing the rate of wear and reducing the time between repair/replacement tasks. A packing environment will be less expensive to create than a mechanical seal environment and does have its own advantages.

Figure 4:
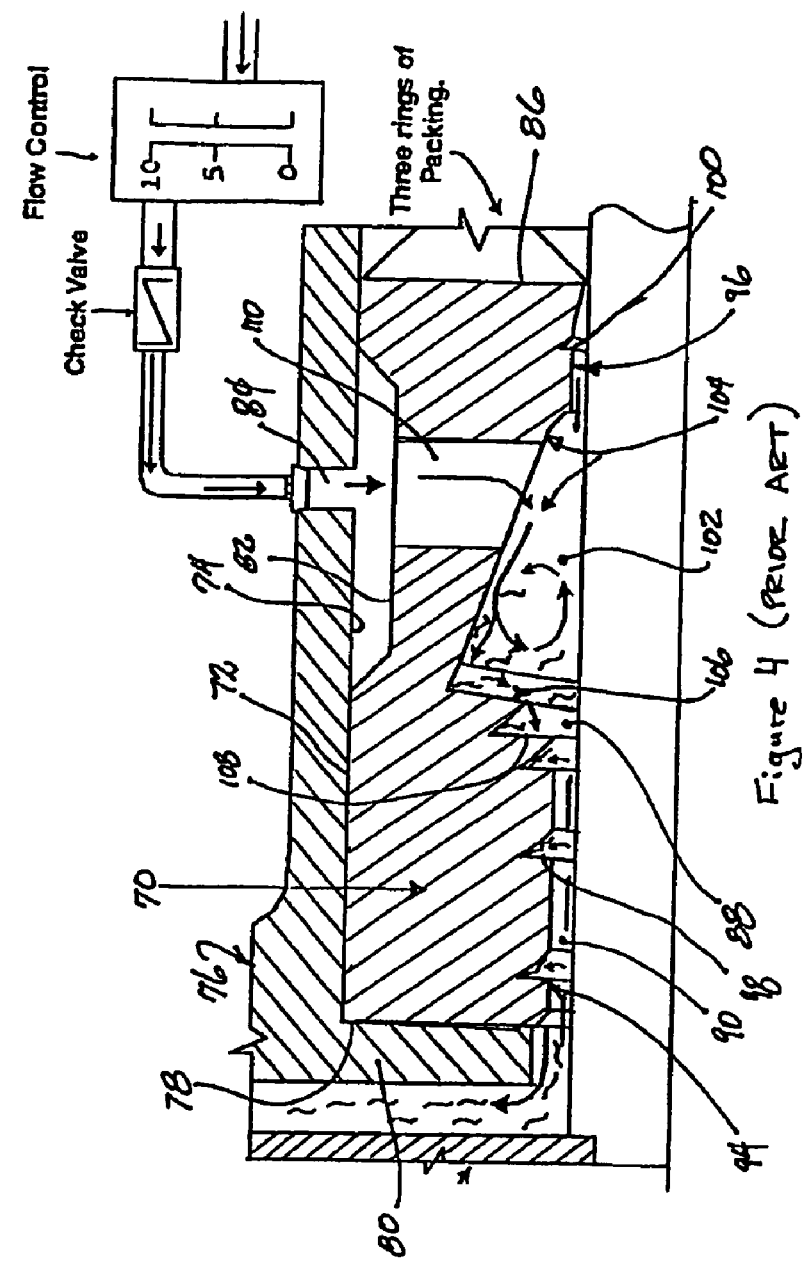
FIG. 4 is a partial cross-sectional view of equipment incorporating a seal cavity bushing that is primarily intended for use in a packing seal cavity environment.

The packing environment has been addressed by the manufacturers of the SpiralTrac™ seal cavity protector, with their Version P device illustrated in FIG. 4. The bushing 70 that is used in a packing environment has an outer cylindrical surface 72 adapted for a tight fit against the cylindrical inner surface 74 of the shaft housing 76 and also has a planar proximal end face 78 adapted for abutment against the throat flange 80 of the housing. Preferably, an annular groove 82 is cut in the outer cylindrical surface 72 for communication with a source of pressurized flushing fluid via one or more ports 84. The annular distal end face 86 of the bushing is also planar and presents a face against which one of a plurality of packing rings can abut when the bushing and packing rings are fitted within the cavity.

Internally, the bushing 70 has a central bore 88 creating a gap 90 between the bore and the outer surface of the shaft 92. The central bore includes proximal and distal sections 94, 96 respectively which are generally cylindrical and which include spiral grooves 98, 100 having the same hand as the rotational direction of the equipment. The bore 88 has a central section 102 which includes a pair of frustoconical surface portions 104, 106. The portion 104 increases in diameter from the proximal end of the distal section 96 while the portion 106 decreases in diameter from the large diameter proximal end of the portion 104 to the distal end of the proximal bore section 94. The face of the portion 106 has a spiral groove 108 cut or formed therein, the groove 108 facing the central section 102 of the bore, having the same hand as the grooves 98, 100, and joining smoothly with the distal entrance to the groove 98. Preferably there are several injection holes 110 communicating the annular groove 82 with the central bore section 102, the holes 110 being drilled or formed so as to be angled generally in the direction of shaft rotation from the groove 82 to the central bore section 102.

In operation, the rotating flow in the central bore section 102 creates an axial flow component drawn from the outer radius of the frustoconical portion 104. A portion of this flow is directed out through the exit or proximal groove 98. Flush is introduced via the port or ports 84 into the groove 82 and then through the angled holes 110 into the central bore section or chamber 102, with the same rotation as the shaft. Only enough flush volume to make up for the flow through the exit groove 98 is required. Any particulate material entering with the flush fluid is immediately separated in the central bore section 102 and is drawn into the spiral groove 108 and is expelled through the exit groove 98. Particulate material entering from behind the impeller is centrifuged by the rotating shaft and fluid into the exit groove 98 which guide such material back towards the impeller. Any particulate material that enters from the packing will be directed by the entrance or distal spiral groove 100 into the central bore section where such material is forced centrifugally along the frustoconical wall of the central portion 104 to the point where it enters the spiral groove 108 and is directed therealong to the exit groove 98 and thence out of the cavity. The flush fluid flowing through the exit groove 98 expels the particulate material under the inner annular edge of the throat flange.

The SpiralTrac™ Version P seal cavity protector enables greatly reduced flush, in comparison to non-use of the device, through enhanced utilization of the flow and centrifugal effects created by the rotating shaft. Particulates are captured and guided away form the adjacent packing ring, thereby reducing sleeve wear. When a good quality packing is used, leakage is reduced to a drip rate and the packing lasts longer.

The foregoing has established the two types of seal cavity protectors that are available for mechanical seal environments and for packing ring environments. There are instances where, for whatever reason, a pump or fluid equipment operator will want to convert from one environment to the other. With existing seal cavity protectors it would be necessary to cast aside the protector currently in use and to replace it with a different type of protector, one particularly suited to the environment to be used. With the present invention it is possible to use a basic or primary packing bushing either by itself, for a packing environment, or in conjunction with a mating secondary bushing, for a mechanical seal environment. FIGS. 5 to 11 illustrate different embodiments and combinations of primary and secondary bushings that will fulfill the need for changes in seal cavity environments.

Figure 5:
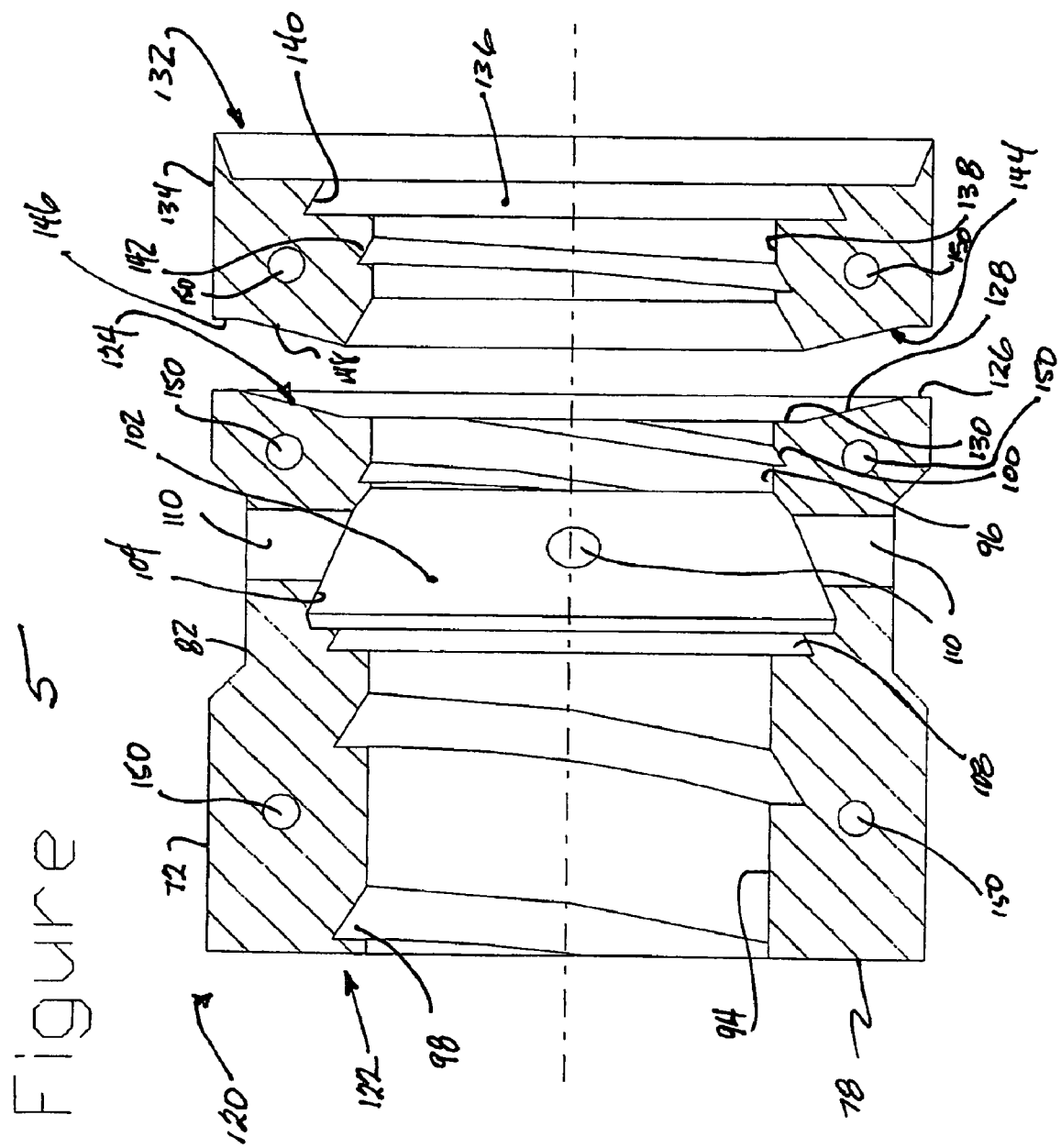
FIGS. 5 to 11 are cross-sectional views of a variety of seal cavity bushing arrangements in accordance with the present invention.

FIG. 5 illustrates one arrangement 120 in accordance with the present invention, this arrangement including a basic, first or primary bushing member 122 that is substantially constructed in a manner similar to the SpiralTrac™ Version P bushing that is used with a packing environment. Thus, this first bushing member incorporates all of the sections, bores, surfaces and grooves of the bushing shown in FIG. 4 and the same reference numbers are used to show the same elements thereof. The main difference between the bushing member 122 and the Version P bushing 70 of FIG. 4 is the annular distal end face 124. As seen in FIG. 5 that end face is not planar. Instead it has a radially outer annular planar portion 126, an inwardly frustoconical portion 128, and a radially inner annular planar portion 130. The purpose of this shaped distal end face will become apparent hereinafter.

The bushing arrangement of this invention includes a second bushing member 132 which has a cylindrical outer surface 134 of the same diameter as the outer surface 72 of the first bushing member 122. The second bushing member 132 has a central bore 136 which defines an inner cylindrical surface 138 of the same diameter as the central bore proximal section 94 of the first bushing member and which opens frustoconically from the distal end of the inner surface 138 towards the outer surface 134 at the distal end of the second bushing member. A spiral groove 140 is cut or formed in the frustoconical face of the central bore, opening towards the seal cavity when in use. The spiral groove 140 is of the same hand as the spiral grooves in the first bushing member 122.

A spiral groove 142 is cut in the inner cylindrical surface 138 of the second bushing member, smoothly mating with the spiral groove 140 so as to channel fluid and contaminants from the open distal end of the second bushing member towards the proximal end thereof. It should be understood that the shaft of the rotary fluid equipment is not shown in FIGS. 5 to 11 and that there would be a small gap between the inner cylindrical surfaces of the first and second bushing members and the outer surface of the shaft when the bushing arrangement is installed in the seal cavity.

The proximal annular end face 144 of the second bushing member is machined so that it will abut in a mating manner with the distal end face of the first bushing member 122. Thus the proximal end face of the second bushing member has radially outer annular planar portion 146 and frustoconical portion 148 which are matable with the corresponding portions of the first bushing member. Preferably, the second bushing member will have a tight fit in the seal cavity so that when it is abutting the first bushing member there will be little or no relative rotation therebetween and the bushings will be in tight axial juxtaposition. If desired, the bushings could be positively connected to each other, as by pins extending axially between the respective end faces 124 and 144 or by intermitting projections and depressions in those faces, to prevent relative rotation. Other conventional connection mechanisms could be used to maintain the first and second bushing members in close, non-rotational juxtaposition to each other.

For a seal cavity that will use packing only one would only use the first bushing member, analogous as it is to the SpiralTrac™ Version P bushing already described. The packing would be positioned within the cavity so that it abuts the distal end face 124 of the first bushing member. For a seal cavity that uses a mechanical seal at the remote end thereof one would use a combination of the first and second bushing members, with the second member's proximal end face 144 abutting and mating with the distal end face 124 of the first bushing member. The flow patterns within the combined bushings would be the same as already described. Should the operator wish to change from one seal environment to the other then the operator would merely add or remove the second bushing member, depending on the particular arrangement to be used.

The two bushing members are shown in FIG. 5 as having opposed bores 150 therein. In practice, one can machine, cast or mould the bushing members from 316 stainless steel, 416 stainless steel, glas filled PTFE (polytetrafluoroethylene), carbon graphite PTFE, bronze or titanium, as single, integral pieces or one can make them as two-piece assemblies for ease of fitment to the seal cavity. For a two-piece assembly, each bushing member would be machined, cast or moulded in two mating and complementary halves, separated by a longitudinally extending parting plane. One of the halves would be provided with the bores 150 and the other of the halves would be provided with complementary pins (not shown) projecting therefrom for reception within the holes 150 during assembly on the rotatable shaft.

Figure 6:
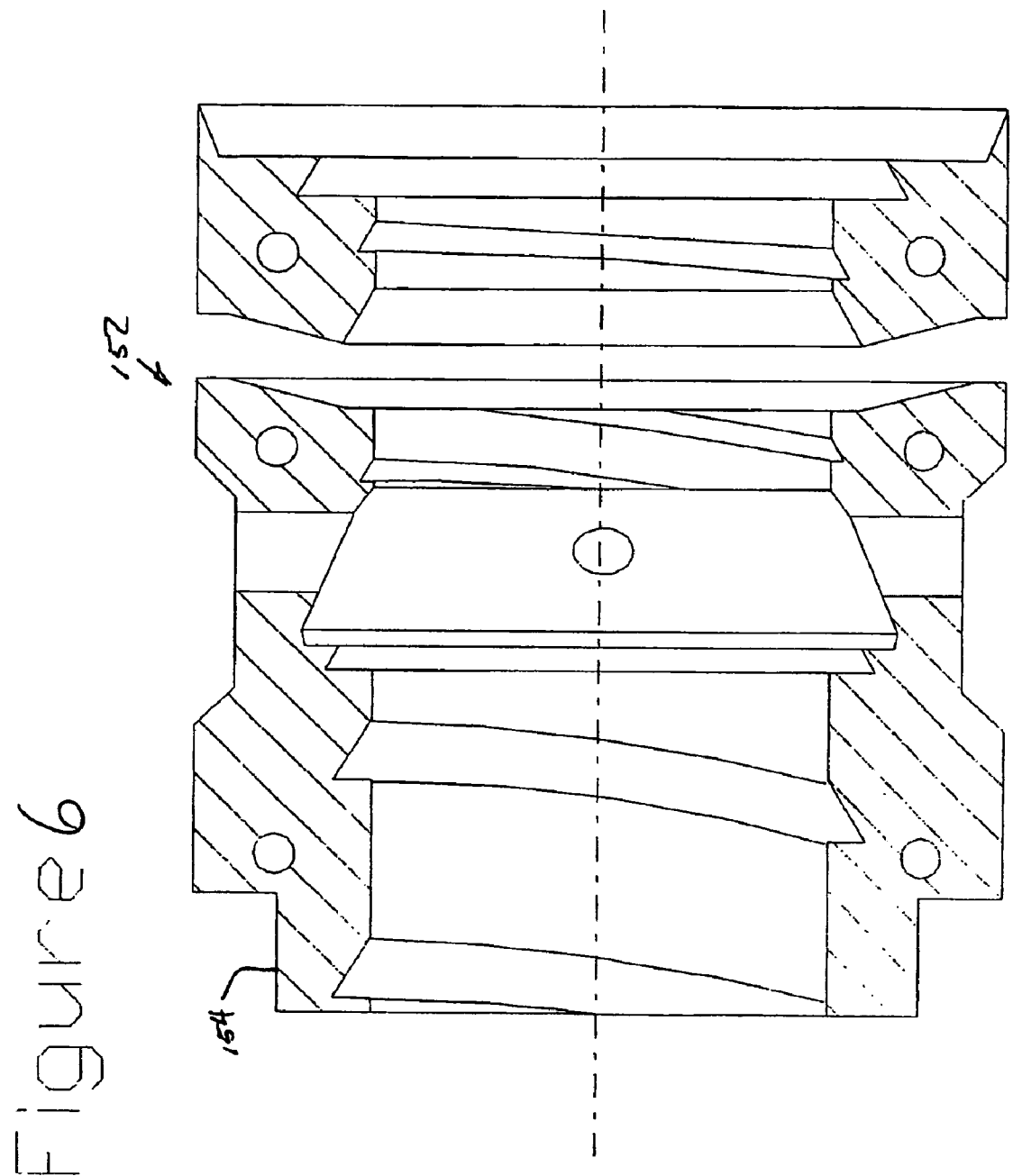

FIG. 6 illustrates an arrangement 152 in which the first and second bushing members are essentially the same as the members 122 and 132 of FIG. 5. The only difference lies in the provision of an annular shoulder 154 in the proximal end face of the first bushing member, which shoulder is adapted to mate with a stepped throat bushing at the entrance zone of the seal cavity, similar to what is shown in FIG. 1.

Figure 7:
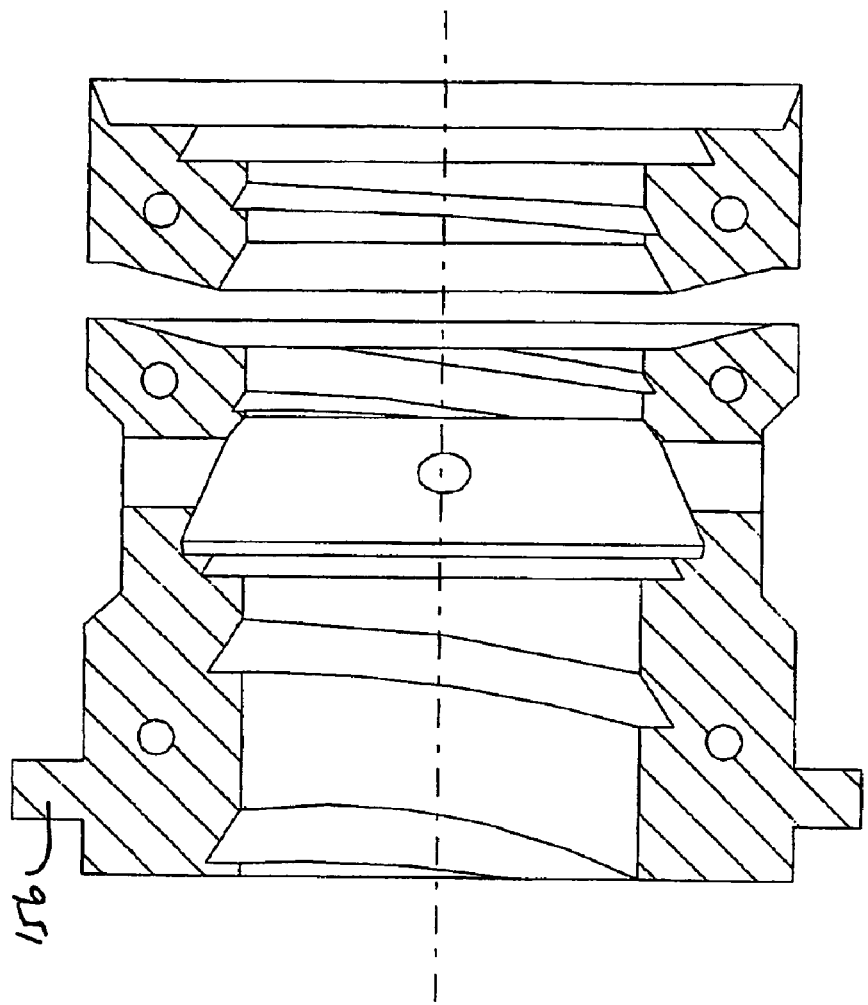

FIG. 7 illustrates another variant of the arrangement of FIG. 5 wherein an external key 156 is provided adjacent the proximal end of the first bushing member for positive positioning of the first bushing member in seal cavities that call for such a key.

Figure 8:
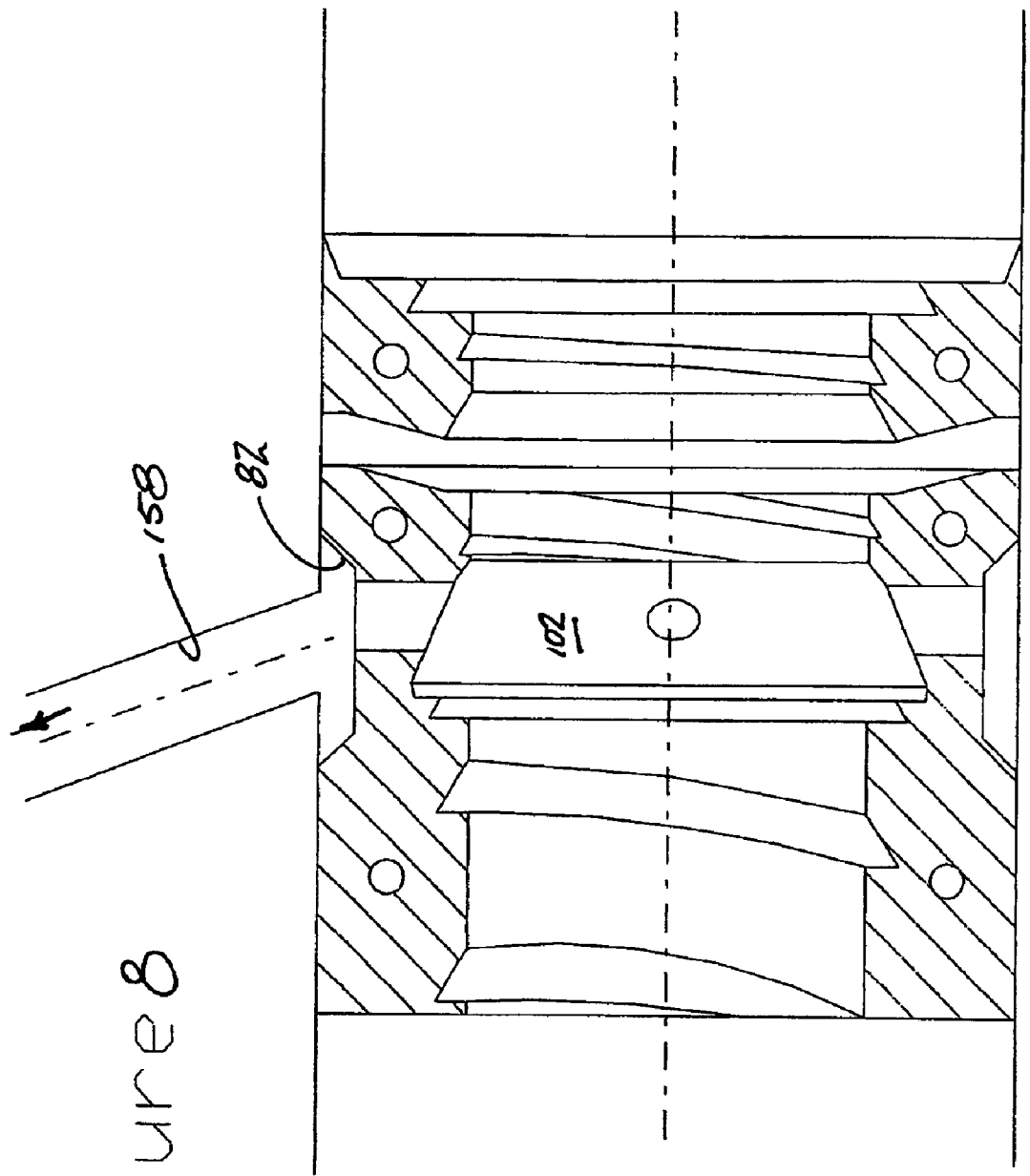

FIG. 8 shows yet another variant of the arrangement of FIG. 5. Here, the bushing members are shown separated but they are also shown generally within a seal cavity housing and with a port 158 communicating with the annular groove 82 in the outer cylindrical surface of the first bushing member. With this arrangement, instead of flushing fluid being forced under pressure into the central section 102 the port 158 is connected to the suction of the pump. With this arrangement, used primarily but not exclusively, with a mechanical seal environment, the second bushing member delivers contaminants to the distal end of the first bushing member for removal through the suction port 158 back to the suction of the pump. Any additional contaminants that are not removed by suction will be removed via the spiral grooves as described hereinabove.

Figure 9:
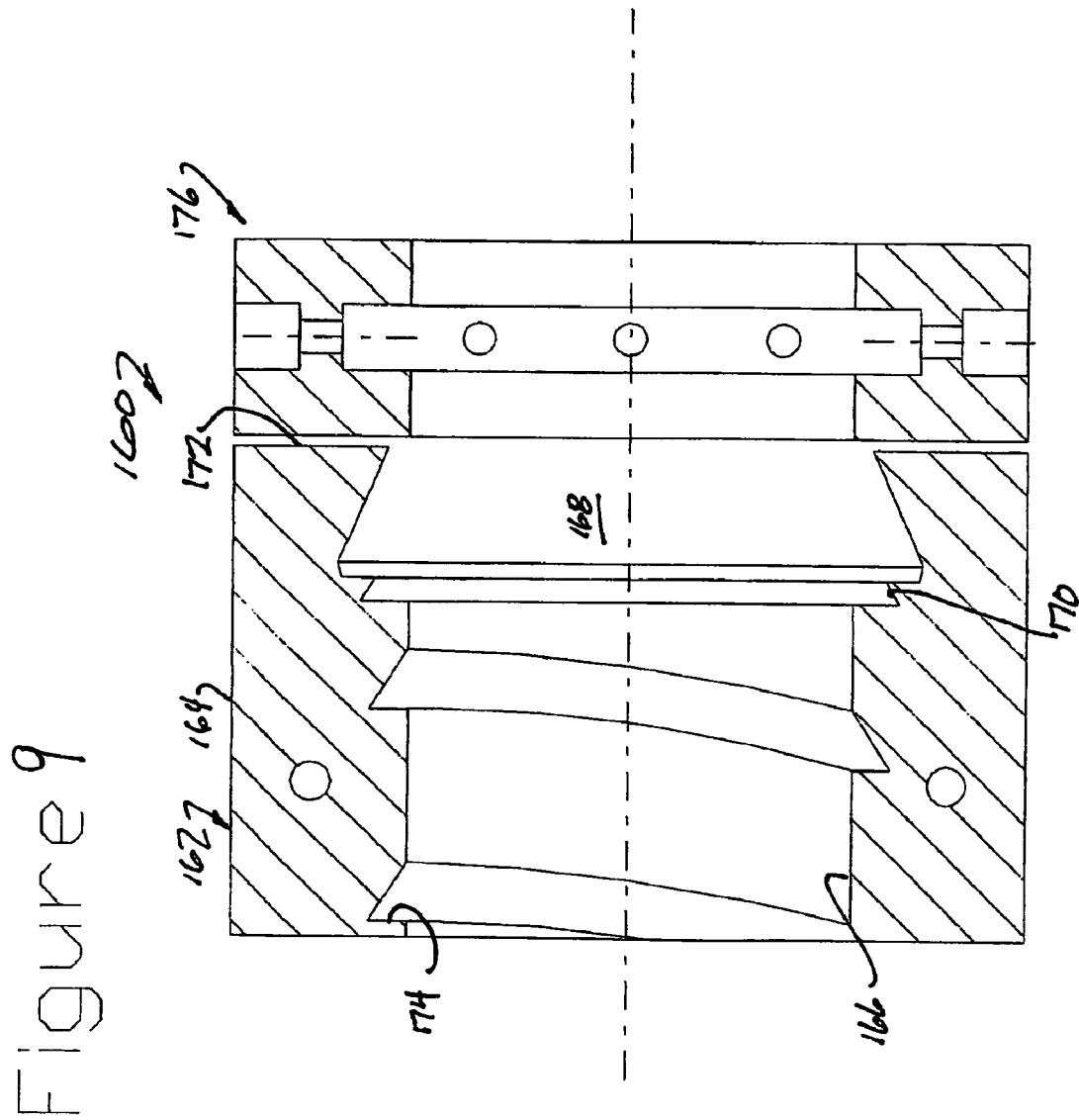

FIG. 9 illustrates a two-piece arrangement 160 that is primarily useful with packing environments only. The first bushing member 162 has an outer cylindrical surface 164 and an inner cylindrical surface 166 defining a central bore 168. The bore 168 enlarges frustoconically from the distal end of the inner surface 166 and is provided with a spiral groove 170 in the sloping face of the bore, the groove 170 opening towards the distal end of the bushing member. From the radially outer end of the sloping face the bore tapers radially inwardly towards the centerline of the bushing member and the annular distal end face 172 of the bushing member. A spiral groove 174 is cut or formed in the inner cylindrical surface 166 as with the bushings described hereinabove.

With this arrangement a standard, commercially available lantern ring 176 is provided for abutment against the distal end face 172 of the first bushing member 162. This arrangement allows the operator to use his existing lantern ring with a first bushing member as described herein.

Figure 10:
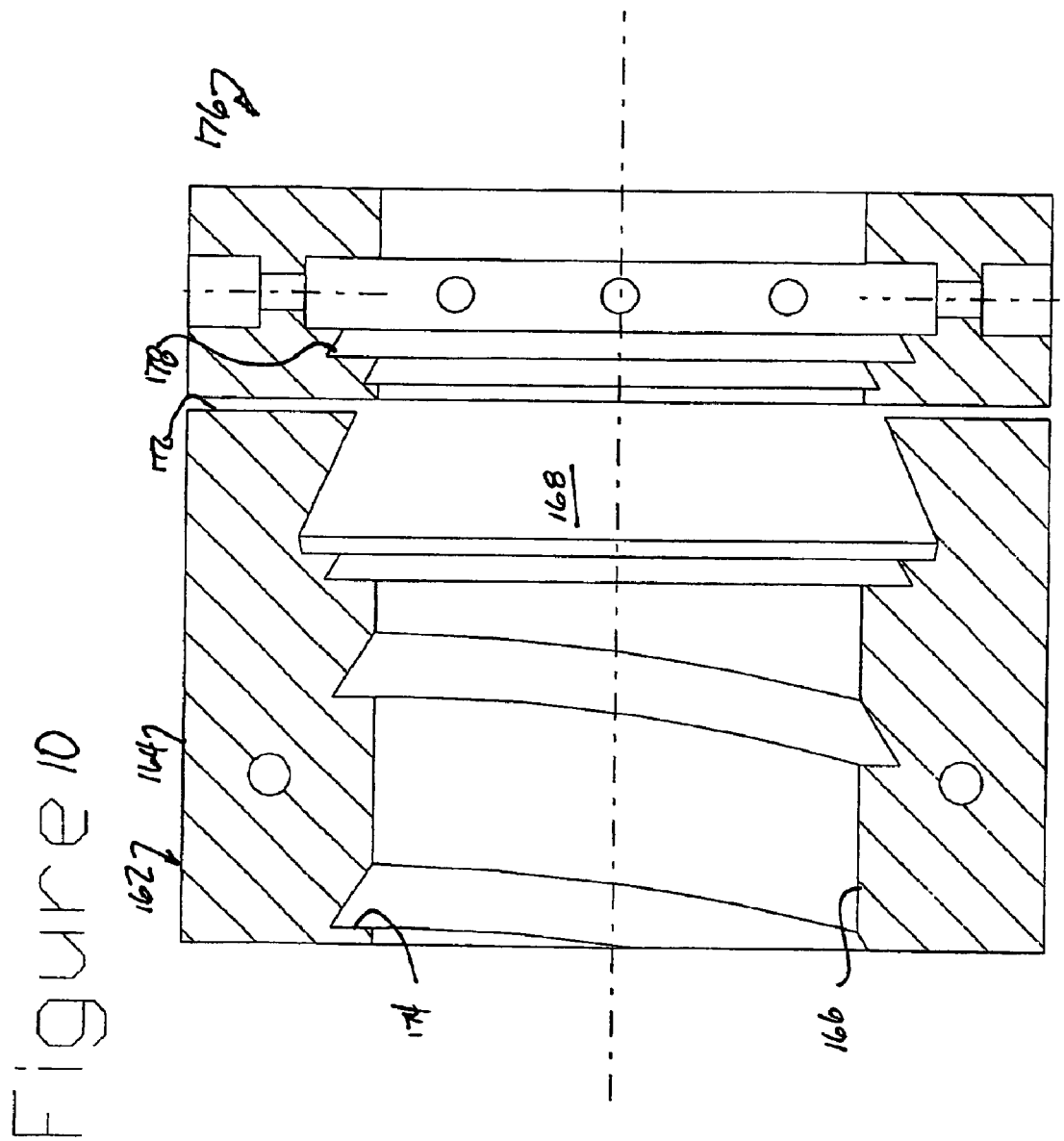

The arrangement of FIG. 10 is similar to that of FIG. 9 but the lantern ring 176 is provided with a spiral groove 178 on its inside surface for the removal of contaminants from the lantern ring to the first bushing member and thence to the impeller side of the rotating equipment. This arrangement is also particularly adapted for packing environments only.

Figure 11:
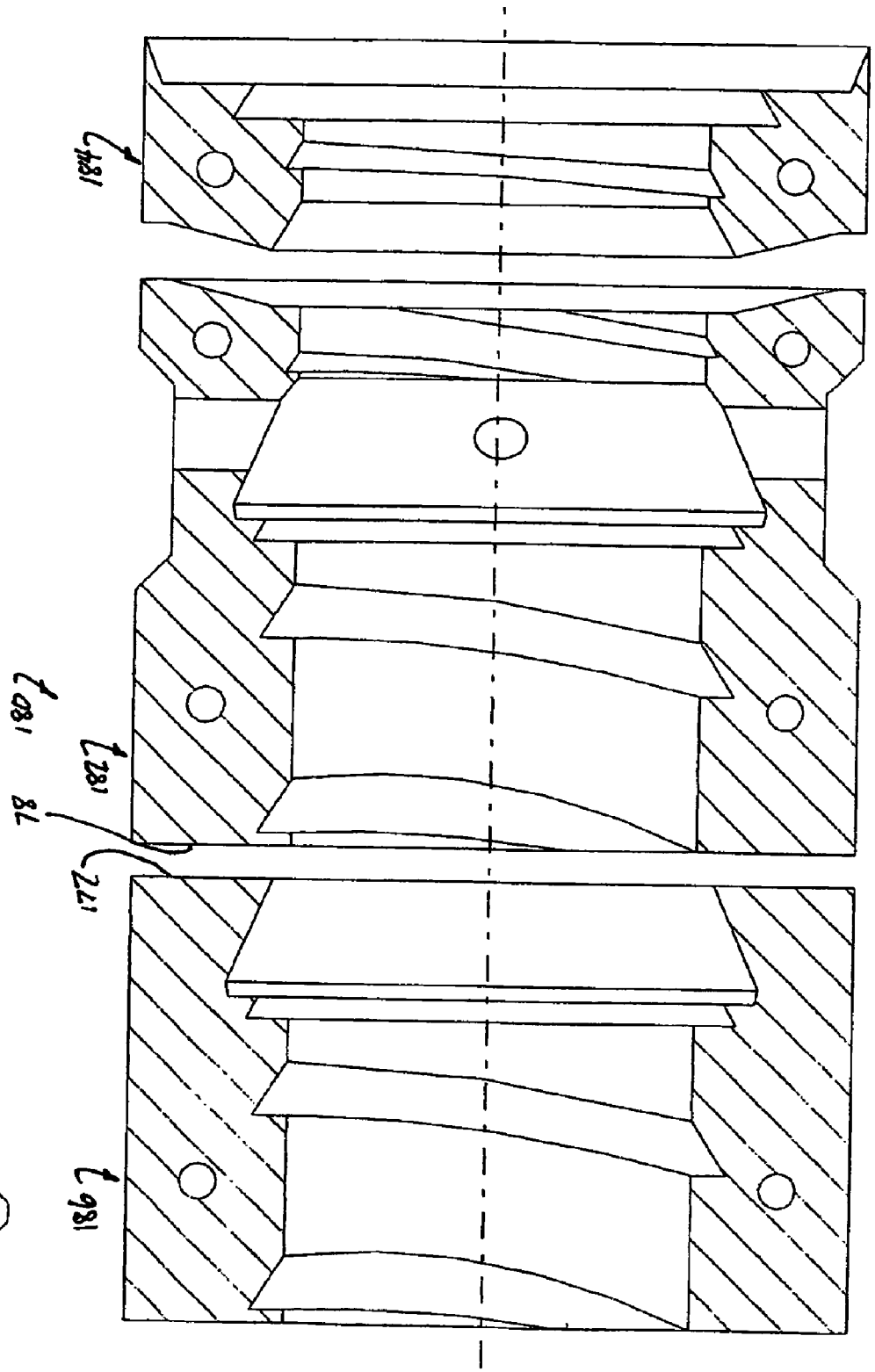

FIG. 11 shows a three-piece arrangement 180 wherein there are first and second bushing members 182, 184 which are the same as the bushing members 122, 142 of FIG. 5 and they operate and co-operate in the same manner. This arrangement incorporates a third bushing member 186 which is essentially the same as the bushing member 162 shown in FIG. 9. The planar annular distal end face 172 of the third bushing member will abut the planar proximal end face 78 of the first bushing member 182 and contaminants will flow from the first bushing member to the third bushing member and then to the impeller side of the rotating equipment. This arrangement would be used when there are physical restrictions within the seal cavity and it becomes necessary to alter the length of the bushing arrangement to achieve a correct installation.

It will be seen from the foregoing that different arrangements of first, second and third bushing members, with or without lantern rings, packing and/or mechanical seals can be used to meet almost any requirement for removing contaminants from a seal cavity. The proven technology of the SpiralTrac™ seal cavity protector has been applied to new components to allow the operator to select appropriate bushings to protect his cavities, whether they use packing or a mechanical seal and the arrangement of this invention will also allow him to change from a packing environment to a mechanical seal environment, or vice versa, without having to destroy or discard bushings which otherwise would still be serviceable.

The invention claimed is:

1. A set of bushing members providing bushing arrangements for protecting a seal cavity of rotary fluid equipment, which cavity is defined in part by a rotatable shaft having an outer cylindrical surface, a surrounding housing having an inner cylindrical surface spaced radially outwardly of said shaft, an entrance zone, and an end remote from said entrance zone, said cavity being adapted to receive conventional packing material therein or to have a mechanical seal positioned at said remote end, said set of bushing members comprising:

a) primary and secondary generally cylindrical bushing members adapted for positioning in said cavity, each such bushing member having an outer cylindrical surface for slidably engaging said housing inner surface, and an inner cylindrical bore of a diameter greater than the diameter of said shaft so as to define an annular gap between such bore and said shaft outer surface;

b) said primary bushing member having proximal and distal annular end faces;

c) the inner bore of said primary bushing member including proximal and distal end sections of generally uniform diameter opening from an interior of said primary bushing member to said proximal and distal end faces respectively, a section of increasing diameter extending into said interior from a proximal end of said distal section, and a section of decreasing diameter extending from a proximal end of said section of increasing diameter to a distal end of said proximal section, at least said section of decreasing diameter defining a spiral groove opening towards said section of increasing diameter and having a hand in the seine direction of rotation as said shaft;

d) said secondary bushing member having a proximal end face adapted for mating abutment against said distal end face of said primary bushing member; and e) said inner bore of said secondary bushing member including a proximal bore section of generally uniform diameter opening from the interior of said secondary bushing member to said secondary bushing member proximal end face, and a distal bore section of increasing diameter leading from a distal end of said proximal bore section to a distal end of said secondary bushing member adjacent the outer cylindrical surface thereof, at least said secondary bushing member distal bore section defining a spiral groove opening towards said secondary bushing distal end and having a hand in the same direction of rotation as said shaft.

2. The set of bushing members of claim 1 wherein each of said proximal and distal bore sections of said primary bushing member and said proximal bore section of said secondary bushing member is provided with a spiral groove of the same hand as the direction of shaft rotation.

3. The set of bushing members of claim 1 wherein said distal end face of said primary bushing member includes a radially outer annular planar portion, an annular radially inwardly frustoconically extending portion and a radially inner annular planar portion, and said proximal end face of said secondary bushing member includes a radially outer annular planar portion and a frustoconical radially inwardly extending portion, said outer planar and frustoconical portions of said secondary bushing member proximal end face being adapted to abut and mate with the outer annular planar portion and the frustoconically extending portion of said primary bushing member distal end face.

4. The set of bushing members of claim 1 wherein an annular shoulder is formed in the proximal end of said primary bushing member adjacent the outer cylindrical surface thereof.

5. The set of bushing members of claim 1 including a key extending radially from the outer cylindrical surface of said primary bushing member adjacent the proximal end thereof.

6. The set of bushing members of claim 1 including a third bushing member for abutment with the proximal end of said primary bushing member, said third bushing member having an outer cylindrical surface for slidably engaging said housing inner surface, and an inner cylindrical bore of a diameter greater than the diameter of said shaft so as to define an annular gap between such bore and said shaft outer surface; said inner bore of said third bushing member including a proximal section of generally uniform diameter opening to a proximal end face of said third bushing member from the interior thereof, a section of increasing diameter leading from a distal end of said third bushing member bore proximal section to a section of decreasing diameter which extends to a planar distal end face of said third bushing member, at least said third bushing member bore section of increasing diameter defining a spiral groove opening towards said third bushing member distal end and having a hand in the same direction of rotation as said shaft.

* * * * *